United States Patent
Metzinger et al.

(10) Patent No.: US 8,622,185 B2
(45) Date of Patent: Jan. 7, 2014

(54) SEALING ARRANGEMENT AND WET-RUNNING DOUBLE-CLUTCH ARRANGEMENT HAVING A SEALING ARRANGEMENT

(75) Inventors: Manuel Metzinger, Buehl (DE); Ivo Agner, Buehl (DE); Oliver Noehl, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1076 days.

(21) Appl. No.: 12/151,109

(22) Filed: May 2, 2008

(65) Prior Publication Data

US 2008/0271968 A1   Nov. 6, 2008

Related U.S. Application Data

(60) Provisional application No. 60/927,299, filed on May 2, 2007.

(51) Int. Cl.
*F16D 25/0638* (2006.01)
*F16D 25/10* (2006.01)
*F16D 25/12* (2006.01)

(52) U.S. Cl.
USPC ............ 192/48.619; 192/85.44; 277/572

(58) Field of Classification Search
USPC ........... 192/48.618, 85.44; 277/551, 572, 925
See application file for complete search history.

(56) References Cited

U.S. PATENT DOCUMENTS

| | | | | |
|---|---|---|---|---|
| 2,549,818 A * | 4/1951 | Joy | ................................ | 92/194 |
| 3,841,204 A * | 10/1974 | Bennett et al. | .................... | 92/86 |
| 3,848,518 A * | 11/1974 | Martin | ............................ | 92/107 |
| 3,924,861 A * | 12/1975 | Szepesvary | .................. | 277/551 |
| 4,724,941 A * | 2/1988 | Wirkner | ....................... | 192/52.2 |
| 5,662,198 A * | 9/1997 | Kojima et al. | ........... | 192/48.611 |
| 6,502,682 B2 * | 1/2003 | Koschmieder et al. | .... | 192/85.54 |
| 2001/0047918 A1 | 12/2001 | Koschmieder et al. | ......... | 192/85 |
| 2004/0035666 A1 | 2/2004 | Grosspietsch et al. | ....... | 192/48.8 |
| 2008/0277228 A1 * | 11/2008 | George | ........................ | 192/48.1 |

FOREIGN PATENT DOCUMENTS

| | | |
|---|---|---|
| DE | 203 10 015 U1 | 8/2003 |
| WO | WO 02/46632 A1 | 6/2002 |

* cited by examiner

*Primary Examiner* — Rodney Bonck
(74) *Attorney, Agent, or Firm* — Davidson, Davidson & Kappel, LLC

(57) ABSTRACT

A sealing arrangement for a pressurizing-agent-operable control device of a clutch arrangement, for sealing a chamber which is pressurizable with a pressurizing agent, assigned to the clutch arrangement, from the interior space of the clutch arrangement; comprising at least one elastic sealing device. The sealing device is guided on at least one sheet metal element, which is attached to an element that delimits the chamber which is pressurizable with a pressurizing agent.

A double clutch arrangement having a sealing arrangement.

42 Claims, 12 Drawing Sheets

SEALING ARRANGEMENT AND WET-RUNNING DOUBLE-CLUTCH ARRANGEMENT HAVING A SEALING ARRANGEMENT

Priority to U.S. Provisional Patent Application Ser. No. 60/927,299, filed May 2, 2007 is claimed, the entire disclosure of which is hereby incorporated by reference herein.

The invention relates to a sealing arrangement for a pressurizing-agent-operable control device of a clutch arrangement, for sealing a chamber belonging to the clutch arrangement which is pressurizable with a pressurizing agent, assigned to the clutch arrangement, from the interior space of the clutch arrangement; in addition, a wet-running double clutch arrangement having a sealing arrangement.

BACKGROUND

Wet-running double-clutch arrangements are previously known in a plurality of versions from the existing art. These have one input and two outputs, the input being formed of a driver unit, which is connected to a first clutch part of each of the individual clutch arrangements of the wet-running double clutch. Each clutch arrangement has a second clutch part, which may be brought into operative connection with the first clutch part and is coupled with the output in a rotationally fixed connection. Such clutch designs are frequently of multidisk or lamellar construction, so that the first clutch part is formed of a first lamellar array and the second clutch part is formed of a second lamellar array, where the two lamellar arrays may be brought into a frictionally engaged operative connection with each other by means of an actuating device, usually in the form of a piston element actuated by a pressurizing agent. To that end, each of the clutch arrangements has its own actuating device, preferably in the form of a piston element. Assigned to the piston element for actuation is at least one chamber pressurizable with a pressurizing agent, but preferably two chambers pressurizable with a pressurizing agent, which act on the two faces of the piston element directed away from each other, and where a first of the chambers pressurizable with a pressurizing agent serves directly as a pressure chamber for operating the piston, and the second chamber assigned to a piston element serves as a compensating chamber. The chambers are connected to a pressurizing agent supply and conducting system, with the individual chambers assigned to a piston element being separately addressable. The contact force of the piston can be set by means of the pressure difference in the two chambers. Because of the wet operation of the lamella, which are always running in oil, the chambers which are pressurizable with a pressurizing agent must be separated from the interior space of the wet-running double clutch. The individual clutch arrangements are situated coaxially to each other and one inside the other in the radial direction, and preferably with little or no offset in relation to each other in the axial direction. The sealing of the individual chambers in relation to the interior space or to each other is accomplished by means of sealing arrangements comprising elastic sealing devices, these being moving sealing devices in this case, since they usually seal the piston in relation to a stationary component, and the sealing surface is moved along with the motion of the piston. The sealing arrangements are therefore normally vulcanized directly onto the piston element, or to an element that is frictionally connected thereto. This means that to apply the sealing device, the entire piston element—and thus a relatively large component which in some versions has a cross section with complex geometry—must be handled and subjected to the vulcanizing process. The geometry of the piston determines both the arrangement of the sealing device and the arrangement and form of the other surface areas of the chamber pressurizable with a pressurizing agent which are to be brought into operative connection with the sealing device. Highly precise fabrication is therefore necessary to realize a reliable sealing function. Furthermore, if the sealing surfaces are damaged there is no simple means of replacing the individual sealing devices.

SUMMARY OF THE INVENTION

An object of the invention is to provide a sealing arrangement for use in clutch arrangements of any desired construction type, in particular in double clutch arrangements, which is characterized by a simple design independent of the design of the piston and is easily replaceable.

In accordance with various embodiments of the present invention, a sealing arrangement, in particular in clutch arrangements, is provided which may include an actuating system having at least one chamber assigned to the actuating system, pressurizable with a pressurizing medium, the sealing device is guided between two coaxial components on at least one sheet metal element, which may be attached to an element that delimits a chamber which is pressurizable with a pressurizing medium. The piston element itself and the elements that delimit the chamber which is pressurizable with a pressurizing agent may be free of machining. The shaping may be shifted to the sheet metal element, which is simple to produce because of its lesser thickness. Furthermore, the sheet metal element can be shaped freely in the region that carries the sealing device, so that it is possible here to match various cross sectional geometries of the sealing devices. The sheet metal element can be joined easily with elements that delimit the chamber which may be actuatable with a pressuring agent. Furthermore, because of its guidance on the sheet metal element the individual sealing device is easily replaceable.

The sheet metal element is preferably a thin sheet metal element, with a thickness in the range of 0.5 to 1.5 mm. That enables its geometry to be matched to the constructional circumstances of the installation situation without major manufacturing expense.

The element delimiting the chamber that is pressurizable with a pressuring agent may be the actuating device itself or a wall of a housing or of the chamber. The individual sealing device is preferably guided in a seal retainer, comprising two sheet metal elements that form a groove to receive the sealing device. This seal retainer is joined to a connecting element, which at least partially delimits the corresponding chamber pressurizable with a pressurizing agent. That makes it possible to provide a simple sealing arrangement for different applications, maximally independent of the piston design, and also to simplify the manufacturing considerably.

At the same time, one of the two sheet metal elements of the actuating device, or some element that delimits the chamber which is pressurizable with a pressurizing agent, can itself be made in a manner that saves parts, or according to an especially advantageous design, since it is also pre-mountable, can be made of two separate sheet metal elements. In the first case, at least two contact surfaces that make the groove may be formed on the sheet metal element, which is joined to the element that delimits the chamber which is pressurizable with a pressurizing agent. The element that delimits the chamber which is pressurizable with a pressurizing agent may forms only a radial or axial contact surface of the groove for the sealing device. That makes it possible to dispense with milling on the elements that delimit the chamber, which would be necessary to receive the sealing devices, and a correspondingly necessary design of the thickness of the latter. Elements that delimit the chamber form contact surfaces merely with their faces which are present anyway, which require no modification.

Another embodiment of the present invention provides the two sheet metal elements can also be made of separate sheet metal elements which form a seal retainer; in this case these are normally disk-shaped, ring-shaped, ring-disk-shaped or bell-shaped forms, where the concrete design of the cross section can be chosen depending on the installation situation and can be included by these additional functions. The component in the form of the seal retainer, made from the two sheet metal elements, may be joined in a rotationally fixed connection either with an element of the actuator, in particular the piston element, or with some other stationary connecting element that delimits the chamber which is pressurizable with a pressurizing agent, at least in the axial direction. One of the dimensions of the sealing device, in particular the sealing device guided in the seal retainer, may be independent of the geometry and/or dimensioning on the element delimiting the chamber which is pressurizable with a pressurizing agent, to which element the seal retainer is also attached, as a result of which the sealing device can be chosen larger or smaller (larger, in the case of the inner circumference) than the dimensioning of the connecting element in the area of the connection. The forming of the groove by means of two separate sheet elements permits individual attention here to installation requirements and spatial circumstances of the design of the piston elements and of the chamber walls. The sealing device and the connecting elements—actuating device and another wall delimiting the chamber—no longer have to be matched precisely to each other in the design of their regions that carry the seal, since this function is now assumed by the seal retainer, by means of which even relatively large intervals can be compensated for in a simple and economical way. Furthermore, because of the variable configuration of the seal retainer and of the part that holds the sealing device, the positioning of the sealing device can also be varied.

Furthermore, no grooves may be incorporated into the elements involved in the clutch arrangement for actuation, in particular the piston element. The manufacturing cost and the required manufacturing precision may be lower than when incorporating grooves according to the existing art, especially in the piston elements. Furthermore, a seal retainer also makes it possible to produce a larger interval between the elements that move in the axial direction, in particular the piston element and the walls delimiting the chambers that are pressurizable with a pressurizing agent, as well as making it easier to even out tolerances.

With regard to the geometry of the construction of the one sheet metal element, or preferably of the seal retainer module from two separate sheet metal elements, and the connection with the actuating system, in particular the piston element or another element delimiting a chamber that is pressurizable with a pressuring agent, there are a plurality of possibilities. When the seal retainer is made of two separate sheet metal elements, the shaping of the groove on the sheet metal elements can be executed on only one sheet metal element or on both. Preferably, a solution on only one is chosen, in which case the second sheet metal element then merely forms an axial contact surface, while the other contact surface then shares in the contact surface function when sealing rings are used. Thus the processing expense for the sheet metal elements can be kept down.

The forming of the groove on the individual sheet metal elements may then be normally accomplished by simple shaping processes, for example deep drawing or stamping. For sealing devices between coaxial components, the groove is situated in the radial outer or inner end region of the seal retainer, so that the sealing device, in particular the sealing surface, either lies in the same plane or with a different diameter—in the case of outside seals, with a larger diameter than the maximum extension of the groove in the radial direction, and in the case of inside seals a smaller diameter than the radial inner extension of the groove. Preferably, the sealing device and thus the sealing surface extend beyond the groove in the radial direction.

The two sheet metal elements can be constructed together as a pre-assembled module, or else they may be joined together with the actuating device or with an element delimiting the chamber that is pressurizable with a pressurizing medium into a module only at the time of installation. In the first case a separate connection may be made between the sheet metal elements, in the second case the connections with the actuating device or with the element delimiting the chamber which is pressurizable with a pressurizing agent may be used to join the sheet metal elements and thus shape the groove, making it possible to save a working step.

The connection of the sheet metal elements is preferably inseparable, in particular a positive or material connection. The connection is achieved for example with penetrating joints, in particular a clinched connection. Welded connections are also conceivable, with a circumferential welded seam or spot welded connections being possible.

The geometry of the sheet metal element design, in particular the design of the cross section viewed in axial section, is dependent on the installation situation and the matching to contact surface regions on the actuating device and the elements delimiting the chamber that is pressurizable with a pressurizing agent. Depending on the design of the seal retainer, in particular of the sheet metal element bounding on the connecting element, the sheet metal elements are formed with surfaces parallel to each other over more or less larger areas. It is conceivable to design the extension of the individual sheet metal elements differently, for example so that they are not in contact with each other over their entire axial and/or radial extension. The concrete geometric design of the seal retainer may always be executed depending on the requirements of the application, in particular on the available construction space and on the design geometry of the walls delimiting the chamber that is pressurizable with a pressurizing agent, as well as of the piston element, with attention to the piston motion, in a clutch arrangement.

A plurality of possibilities also exist for the connection between the seal retainer made of one or two sheet metal elements, in particular the connection of the sheet metal element with the connecting element. The connection can be made using frictional or positive locking or adhesive force. Furthermore, it can be separable or inseparable. Preferably, the connection with the connecting element, in particular with the actuating device, is inseparable, either through adhesive force or a positive connection or else a joining technique, which is referred to for example as through joining or pressure joining, in particular clinching. This is a joining process for connecting sheet metal elements, free of any additional material. It is a combination of a shaping process and a joining process, with the joining being accomplished through plastic deformation. Another possibility of connection consists in a compression connection, in particular in the case of ring-shaped sealing devices.

The possibility of a material connection is produced for example by spot welding, it being possible here to apply various welding techniques. The positive connection may be realized here by means of rivet joints, which may involve separate rivets or rivets extruded from the connecting element. If the connection is made in spots along the extent of the seal retainer, it does not produce a closed sealing edge between the seal retainer or the sheet metal element on the piston and the actuating device. In this case leakage flows are possible, so these can be controlled by the connection. If these are to be avoided, an uninterrupted joint that is pressure-tight and liquid-tight over its entire extent is necessary. This can be produced by means of an extended two-dimensional connection or else through additional sealing devices between the sheet metal element on the piston and the actuating device itself, or the element delimiting the chamber pressurizable with a pressurizing agent and the sheet metal element in contact therewith. Depending on whether a complete seal is provided by the sealing device, it may be necessary to also design the connection between the two sheet metal elements and between the sheet metal elements and the connecting element so that it is pressure-tight and liquid-tight. This may involve regions oriented in the axial and/or in the radial direction. Consideration must also be given to whether or not a leakage flow is permissible. If avoidance of a leakage flow between the seal retainer and a connecting element is desired, it is conceivable to provide sealing lips in the area of contact between these, preferably a plurality of sealing lips placed one behind another. In the simplest case these can be incorporated in the form of beads running in the circumferential direction, which form correspondingly sealed surfaces after the seal retainer is joined to the connecting element. Another possibility would be to use a surface seal.

An especially advantageous embodiment provides a wet-running multi-plate clutch, in particular a double clutch arrangement. The latter includes a first clutch arrangement and a second clutch arrangement, which may be situated between an input and one output each, each of the two clutch arrangements having a first clutch part that may be connected to the input in a rotationally fixed connection and a second clutch part that may be connected to an output in a rotationally fixed connection, with an actuating device bringing the two clutch parts into operative connection with each other. To that end, the actuating device includes an actuating element in the form of a piston element that may be operated by a pressurizing agent. In addition, at least one and preferably two chambers that can be pressurized with a pressurizing agent may be assigned to the piston element. The first chamber here may be a pressure chamber, the second may be a compensating chamber. In order to seal the individual chambers off from the rest of the interior of the clutch, sealing arrangements designed according to the invention are provided. These may be situated in each case between two coaxial components, in particular the piston element and a connecting element, preferably an element that forms a wall.

BRIEF DESCRIPTION OF THE DRAWINGS

The invention will be explained below on the basis of figures. They depict the following details.

DETAILED DESCRIPTION

Figure 2:
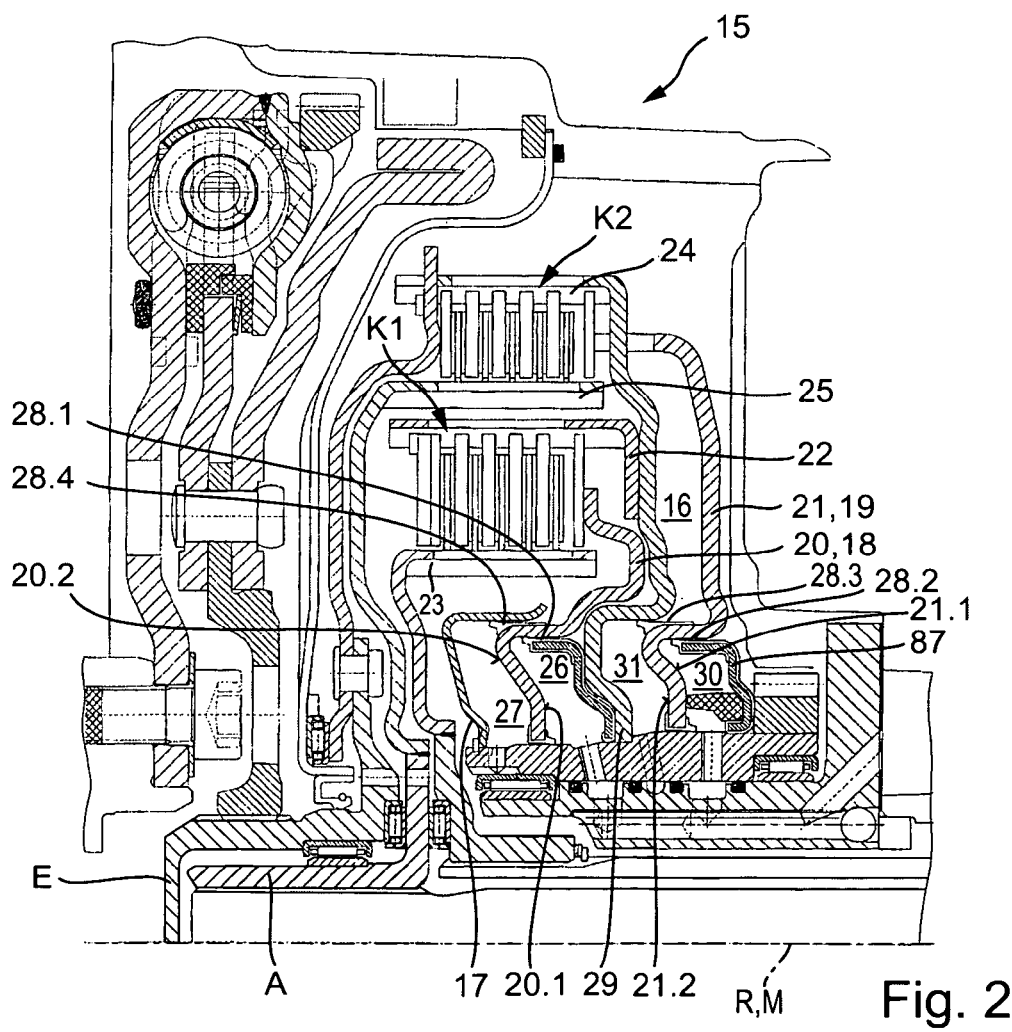
FIG. 2 shows a detail from an axial section through an actuating unit of a wet-running double clutch arrangement having vulcanized-on sealing devices according to the existing art.

FIG. 2 illustrates a detail from an axial cross section of a wet-running double clutch assembly 15 according to the existing art, comprising an input E and two outputs A and clutch devices situated between them, a first clutch device K1 and a second clutch device K2, each of which is operable by means of actuating devices 18 and 19 respectively assigned to them, which are actuated by a pressurizing agent, there being assigned to each of the individual actuating devices in the form of a piston element 20, 21 at least one chamber pressurizable with a pressurizing agent, preferably chambers situated on both sides of the piston element 20, 21 and pressurizable with a pressurizing agent. Assigned to piston element 20 are a first chamber 26 pressurizable with a pressurizing agent and a second chamber 27 pressurizable with a pressurizing agent, the two chambers taking effect on the opposing faces 20.1 and 20.2 respectively. Assigned to piston element 21 are a first chamber 30 pressurizable with a pressurizing agent and a second chamber 31 pressurizable with a pressurizing agent, the two chambers taking effect on the faces 21.1 and 21.2 respectively. Chambers 26 and 30 function as pressure chambers, and chambers 27 and 31 as compensating chambers. The pressure difference between the chambers 26, 27 or 30, 31 respectively, assigned to a piston element 20 or 21 respectively, determines the contact force of the piston element 20, 21. The sealing off of the individual chambers 26, 27, 30, 31, which are pressurizable with a pressurizing agent, from the interior space 16 of the double clutch arrangement 15, is accomplished by means of sealing devices 28.1 through 28.4 between the individual piston element 20 or 21 and another element that delimits the chambers 26, 27, 30 and 31 which are pressurizable with a pressurizing agent, in this case the housing parts 17 and 29 and another element 87 that delimits the pressure chamber 30. To that end, the sealing devices 28.1 through 28.4 are vulcanized onto the piston elements 20, 21. The process is relatively complex because of the required handling of the piston elements 20, 21, and exact assignment of positions among the piston elements 20, 21 and the materials forming the respective sealing devices 28.1 through 28.4 is necessary in the vulcanizing procedure. Replacement in the event of damage to an individual sealing device is possible only at considerable effort and expense. In order to avoid this detriment, in particular when sealing off components that are situated coaxially and are movable in the axial direction relative to each other, according to the invention a sealing arrangement 1 is utilized, comprising a seal retainer 10 and at least one elastic sealing device 5, which may be in the form of an individual sealing element, a compound element or a unit made up of a plurality of sealing elements. Seal retainer 10 includes at least one sheet metal element that is attached to a component which delimits the chamber 26, 27, 30 or 31 which is pressurizable with a pressurizing agent.

Figure 1A:
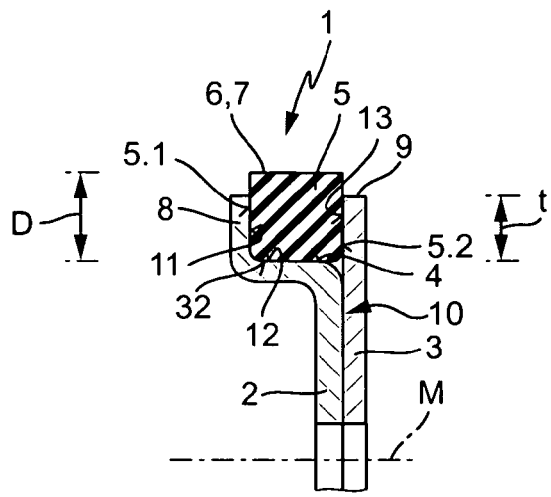
FIGS. 1a and 1b show in a simplified schematic depiction two variants, of a first version of a seal retainer designed according to the invention, made of two separate sheet metal elements.

FIG. 1a illustrates in a simplified schematic depiction one possible variant of a first embodiment of a sealing arrangement 1 according to the invention with a seal retainer 10, for use in sealing concepts for clutch arrangements, in particular for wet-running double clutch arrangements 15, to seal off the chambers 26, 27, 30, 31, which are assigned to the actuating system, in particular actuating devices 18, 19, and are pressurizable with a pressurizing agent, from the interior space 16, and to seal the chambers from each other. Seal retainer 10 in the first embodiment comprises two sheet metal elements, a first sheet metal element 2 and a second sheet metal element 3, which form a groove 4 to receive at least one sealing device 5. Sheet metal elements 2 and 3 here are ring-disk-shaped elements, which have a middle axis M that coincides with the axis of rotation R of the double clutch arrangement 15 in the installed position. In the simplest case, sealing device 5 is designed as a sealing ring. This is placed in groove 4 and is held in position by the two sheet metal elements 2 and 3. Sealing device 5 has at least one sealing surface 6, which is formed by at least a partial surface of the outer circumference 7 of sealing device 5, preferably by the entire surface describing the outer circumference 7. Sealing device 5 is at least partially received in groove 4, at least far enough so that when sealing device 5, and thus sealing surface 6, moves relative to a stationary sealing surface, in particular in the axial direction, sealing device 5 cannot be pushed out. To that end, second sheet metal element 3 is designed in the area bounding groove 4, in particular in the end region 9, so that it forms a flat contact surface 13 facing in the axial direction for sealing device 5, while first sheet metal element 2 is cranked in its radial end zone, or shaped so that it forms the contact surfaces 11 and 12 that form the groove 4. The shaping of the ring-disk-shaped elements can be accomplished in a simple way through forming, in particular deep drawing. Other procedures are conceivable. Contact surface 11 here is an axial contact surface, contact surface 12 a surface facing in the radial direction, in this case to support the inner circumference 32 of sealing device 5.

Depending on the design of the sealing device 5, in particular of the sealing surface 6 as a flat surface or inclined surface extending in the axial direction, the sealing surface 6 may extend over only a part of the outer circumference 7, viewed in the radial direction, or completely over the entire outer circumference 7. In the first-named case, the sealing device 5 can end with its outer circumference 7 in the region free of the sealing surface 6 flush with the end area 8 or the end area 9 on the respective sheet metal element 2, 3, as shown in a concrete embodiment in FIGS. 9 and 10. Otherwise, the groove 4 is designed so that its depth t is less than the thickness D of the sealing device 5 in the radial direction. The embodiment according to FIG. 1a illustrates an especially advantageous design, with little processing expense to produce the groove 4 on the second sheet metal element 3.

Figure 1B:
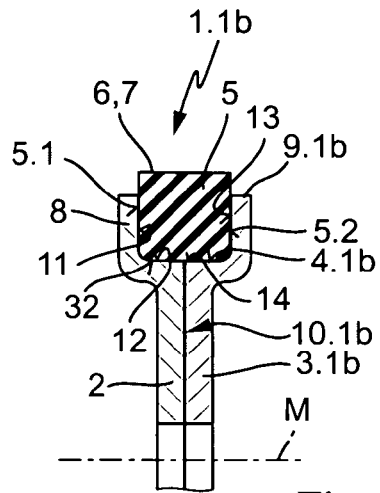

It is also conceivable, however, to form a groove 4.1b by means of the formed execution of both sheet metal elements 2, 3.1b, through proper design of the end regions 8 and 9.1b of the two sheet metal elements 2 and 3.1b, as depicted in FIG. 1b, so that the sealing device 5 on each of the sheet metal elements 2 and 3.1b finds support both in the axial direction with its faces 5.1 and 5.2 as well as in the radial direction with its inner circumference 32 on contact surfaces 12 and 14 facing outward in the radial direction on the two sheet metal elements 2 and 3.1b. At the same time, seal retainer 10, 10.1b can be delivered preassembled as a separate module. In that case, a rotationally fixed connection between the two sheet metal elements 2 and 3 or 2 and 3.1b would be necessary, which is produced by positive connection, frictional lock or material connection, or else seal retainer 1 is assembled only in the installation situation, in which case the linkage for clutch arrangements 15 is to the elements of the actuating system, in particular the individual actuating devices 18, 19 or some other component delimiting the chamber which is pressurizable with a pressurizing agent, in particular in the form of housing walls that are fixed in the axial direction. The linking of the sealing device 5 through the seal retainer 10, 10.1b offers the advantage that the latter can be integrated into any installation situation by means of the adapted shaping and design of the sheet metal elements 2, 3, and also that the most varied sealing layers are possible by means of the corresponding geometric shaping of the sheet metal elements in cross section. This offers the advantage, in particular with larger connecting parts, that the individual sealing devices 5 in a sealing arrangement 1 according to the invention can be integrated into the connecting elements here in a simple way without great effort and expense, and also can be retrofitted. Wet-running double clutch arrangements are an especially advantageous area of application for the sealing arrangement 1 according to the invention.

Figure 3:
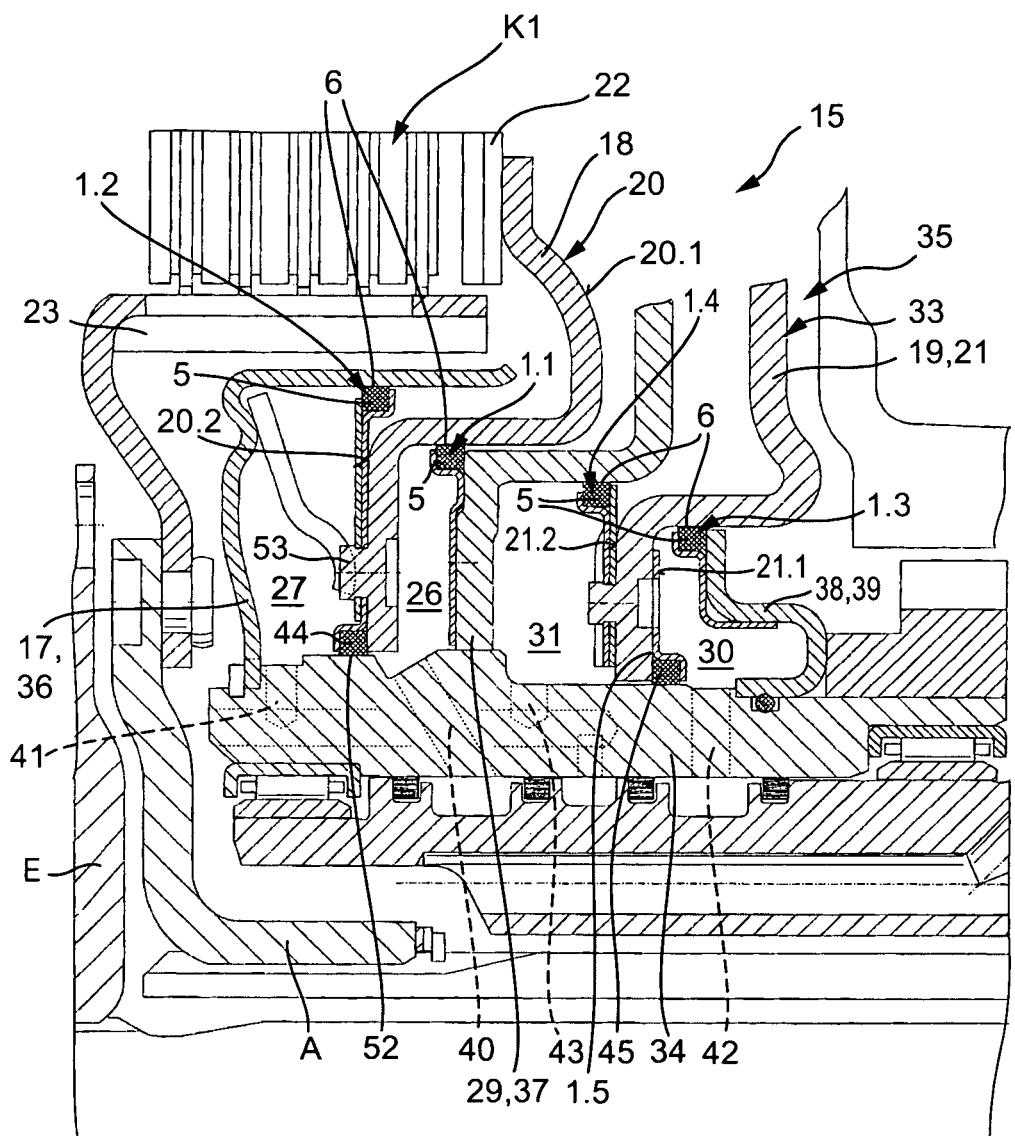
FIG. 3 shows the use of the sealing concept according to the invention in a double clutch arrangement.

FIG. 3 illustrates, on the basis of a detail from an axial section, the use of sealing arrangements 1 according to the invention with a seal retainer 10, in sealing concepts for the actuating unit 33 in double clutch arrangements 15. Double clutch arrangement 15 includes a first clutch device K1 and a second clutch device K2. The basic construction corresponds to that described in FIG. 2; for that reason the same reference numbers are used for the same elements. Each of the clutch devices K1 and K2 has an actuating device 18 or 19 assigned to it, comprising a piston element 20 or 21 in the simplest case. These act on the individual clutch devices K1, K2, in order to bring the individual clutch parts into operative connection with each other. In this instance each clutch device K1 or K2 comprises a first clutch part 22 or 24 respectively and a second clutch part 23 or 25 respectively, with the first clutch part 22 of the first clutch device K1 being connected to the input E in a rotationally fixed connection, while the first clutch part 24 of the second clutch device K2 is likewise connected to the input E, and the second clutch part 23 of the first clutch device K1 and the second clutch part 25 of the second clutch device K2 are coupled with the output A of the double clutch arrangement 15. The individual outputs A are each couplable with a transmission input shaft of a downline transmission, or they constitute that input shaft. When the system is designed as a disk clutch, first clutch part and second clutch part are designed in disk form, preferably in lamellar construction. The transmission of force takes place through frictional locking by means of the contact pressure between first and second clutch parts 22 and 23 or 24 and 25, which is realized by means of the actuating devices 18 and 19, in particular the piston elements 20 and 21. To actuate pistons 20 and 21, chambers pressurizable with a pressurizing agent are assigned to each individual piston element 20 and 21; these chambers pressurizable with a pressurizing agent act directly on one of the piston end faces. Assigned to first piston element 20 are a first chamber 26 pressurizable with a pressurizing agent and a second chamber 27 pressurizable with a pressurizing agent, which take effect on the opposite end faces 20.1, 20.2 of piston element 20. By analogy to the above, a first chamber 30 pressurizable with a pressurizing agent and a second chamber 31 pressurizable with a pressurizing agent are assigned to piston element 21, with the first chamber 30 pressurizable with a pressurizing agent taking effect here on end face 21.1 of piston element 21, and the second chamber 31 pressurizable with a pressurizing agent taking effect on end face 21.2 of piston element 21. The first chambers 26, 30, acting in the operating direction of piston element 20, 21 against clutch devices K1 and K2 function in this case as pressure chambers, while the other chambers 27 and 31 pressurizable with a pressurizing agent, acting on the opposite end faces 20.2, 21.2, function as compensating chambers. Depending on the adjustment of the pressure ratios in the two chambers assigned to a piston element 20, 21, the contact of the piston element 20, 21 is varied. To this end, the individual piston element 20 or 21 is guided so that it can slide in the axial direction, but it is preferably connected to the input E at least indirectly in a rotationally fixed connection. The connection is made here in an exemplary manner by means of a corresponding piston hub 34, on which the piston elements 20, 21 and the walls of the clutch housing 35 are carried. In this design, the individual pressure chambers 26, 27, 30, 31 are each sealed off by means of at least one sealing arrangement 1.1, 1.2, 1.3, 1.4 and 1.5. One sealing arrangement 1.2 here is situated in the middle of a component 36 that is stationary in the axial direction, which functions as a housing wall 17 in the clutch arrangement 15. Sealing arrangement 1.2 serves to seal off the second chamber 27, pressurizable with a pressurizing agent, which is assigned to piston element 20. Sealing arrangement 1.1 is situated between another component 37 in the form of housing part 29, which is stationary in the axial direction, and piston element 20, and serves to seal off the chamber 26, which is pressurizable with a pressurizing agent. These statements are also applicable by analogy to second piston element 21 and to the chambers 30 and 31, which are assigned thereto and are pressurizable with a pressurizing agent, where the first chamber 30 pressurizable with a pressurizing agent is sealed off by means of sealing arrangements 1.3 and sealing arrangement 1.4 serves to seal off the chamber 31 which is pressurizable with a pressurizing agent. The individual sealing arrangements 1.3, 1.5 and 1.4 here are each situated between a housing part that is stationary in the axial direction and piston element 21, where sealing arrangement 1.3 is situated in the middle of a component 38 in the form of a housing wall 39, while sealing element 1.4 is situated between piston element 21 and the component 37 which forms housing wall 29. Sealing arrangement 1.5 is situated between piston hub 34 and piston element 21. Here the individual housing parts that form housing walls can be connected to input E of the clutch arrangement in a rotationally fixed connection, and rotate with it. This means that sealing device 5, in particular the fully formed sealing surfaces 6 of the individual sealing devices 5 in the circumferential direction, do not have to move relative to the components which are adjacent or which form the contact surfaces, but because of the movability of the piston element 20 or 21 are in any case movable in the axial direction or interact with a movable surface in the sealing pairing.

For the individual sealing arrangements 1.1 through 1.5 there now are a plurality of possibilities of design and of attachment to the piston elements 20 and 21; in particular, the individual chamber 26, 27, 30 and 31 which is pressurizable with a pressurizing agent is always sealed off between piston element 20 or 21 and a connecting element. Thus the pressure conditions in the individual chambers 26, 27, 30 and 31 which are pressurizable with a pressurizing agent can adapt free of the conditions in the internal space 16 of the clutch arrangement, in particular if the clutch here is a wet-running friction clutch such as a multi-plate clutch, in which the plates are running in oil. The individual chambers pressurizable with a pressurizing agent are connected to corresponding pressurizing agent supply and removal channels, for which they each have at least one connection 40, 41, 42 and 43. The channels can be operatively connected with each other, and the circumstances in the chambers 26, 27, 30, 31 which are pressurizable with a pressurizing agent can be set and at least controlled using means for controlling the flow of process fluid or pressurizing agent.

Sealing arrangement 1.2 comprises two sealing devices, a sealing device 5 and another sealing device 44, which is situated between piston element 20 and piston hub 34. Furthermore, another sealing arrangement 1.5 is provided between piston element 21 and piston hub 34.

Figure 4:
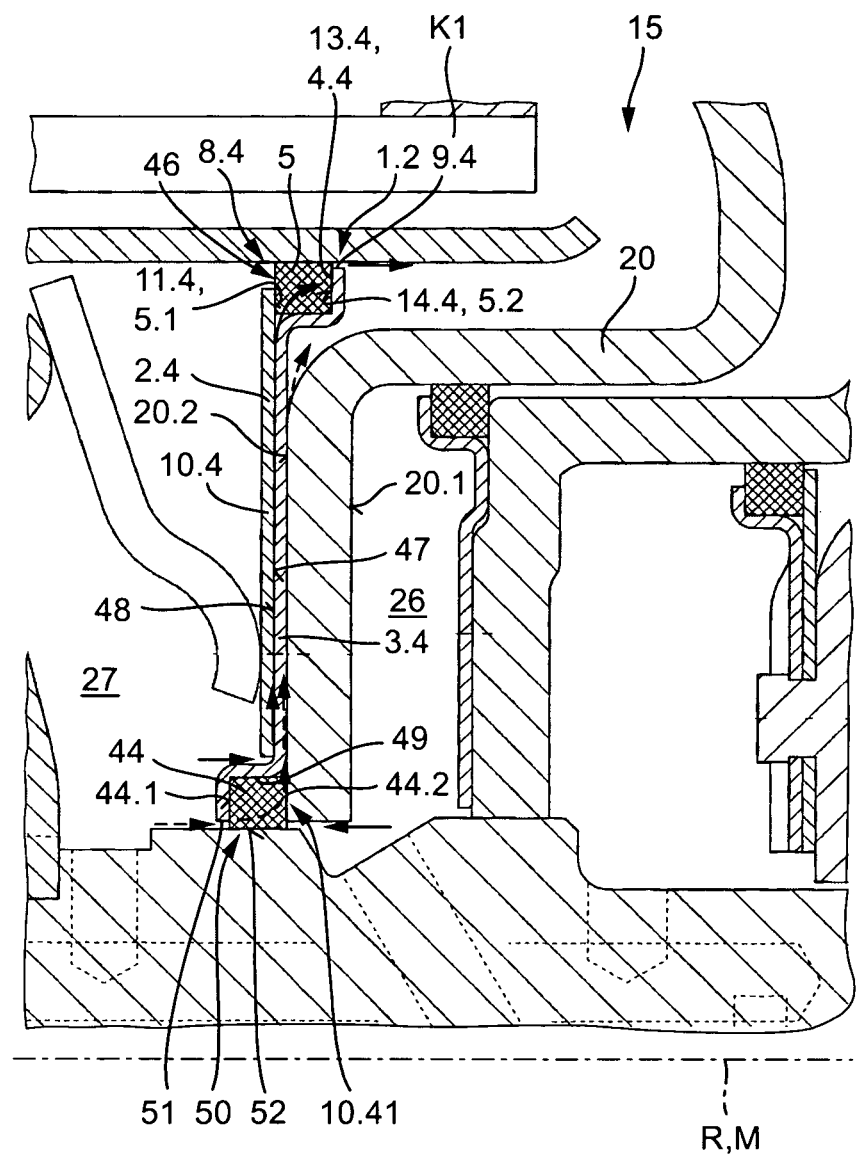
FIG. 4 shows a first possible embodiment of the execution and arrangement according to the invention, of a sealing arrangement for sealing off a compensating chamber of a double clutch arrangement.

FIG. 4 illustrates, on the basis of an enlarged detail from a cross sectional depiction of double clutch arrangement 15 according to FIG. 3, the sealing concept of sealing off chamber 27 by sealing arrangement 1.2, which is situated between piston element 20 and the connecting elements that delimit chamber 27, which is pressurizable with a pressurizing agent. To that end, sealing arrangement 1.2 comprises two sealing devices 5 and 44, which are situated and guided on a seal retainer 10.4. Seal retainer 10 consists of two sheet metal elements 2.4 and 3.4, whose faces 47 and 48 rest against each other, and where face 47 of sheet metal element 2.4 forms a contact surface 11.4 for sealing device 5 in the axial direction in the area of the outer circumference 46 in the end region 8.4 formed in the radial direction, while second sheet metal element 3.4 forms the groove 4.4, in that the end region 9.4 of second sheet metal element 3.4 is L-shaped when viewed in cross section and forms a stop face 14.4 in the radial direction and 13.4 in the axial direction for sealing device 5. Furthermore, sealing arrangement 1.2 includes a second sealing device 44, which is situated in the area of the inner circumference 50 of sealing retainer 10.4, and when piston element 20 is guided at an interval from the piston hub 34 coupled with input E, it largely seals off the chamber 27 which is pressurizable with a pressurizing agent from chamber 26. To that end, seal retainer 10.4, in particular the sheet metal element 3.4 on the piston side, is also designed with corresponding shaping in the radially inner end region. The groove on the inner circumference 50 is designated as 49. The latter is only partially formed by seal retainer 10.4, however. Sheet metal element 3.4, situated on the piston side, assumes the function of a seal retainer here together with piston element 20; that is, piston retainer 10.4 is a component of another seal retainer 10.41 made from piston element 20 and sheet metal element 3.4. To save construction space and material, seal retainers 10.4 and 10.41 can thus have jointly used components, in particular sheet metal elements. Seal retainer 10.4 here supports the two seals 5 on the outer circumference and 44 on the inner circumference 50. At the same time, the function of seal retainer 10.4 for sealing device 44 on the inner circumference 50 is assumed by sheet metal element 3.4 and directly by piston element 20, so that sealing device 44 is passed directly in the axial direction between the second disk-shaped element 3.4 and piston element 20. The sealing surface 52 of sealing device 44 in the radial direction is formed here by the inner circumference of sealing device 44, preferably by the entire surface of sealing device 44 that describes the inner circumference. To guide the two sealing devices 5 and 44, second sheet metal element 3.4 has a double-S-shaped cross section, or is formed in opposite directions in the radial outer region and in the radial inner region, in particular deep drawn. Seal retainer 10.4 is connected to piston element 20 here in a rotationally fixed connection. Theoretically, all the possibilities of frictional or positive locking or adhesive force are conceivable for connecting them. FIG. 3 illustrates one possibility of positive locking here by means of riveting. In this version, the rotationally fixed coupling is executed inseparably by riveting with rivets 53 extruded from piston element 20. A possible version with spot welding or clinching would also be conceivable here, however. FIG. 3 illustrates the section pattern in the axial section through the riveting of sealing arrangement 1.2, FIG. 4 the section pattern in the area free of the riveting.

Teflon rings, elastic shaped rings in the form of X-rings or butterfly rings, or else elastic lip rings can be utilized as sealing devices 5 and 44. All of these are always contacting and movable seals.

No additional sealing is necessary on the individual sheet metal elements 2.4 and 3.4 to prevent leakage. This function is assumed here by the two seals 5 and 44. Even if possible leakage passes between the two sheet metal elements 2.4 and 3.4, this task is taken over by sealing surface 6 with respect to the stationary component 36s and by the axially directed sealing surfaces 5.1 and 5.2 of sealing device 5 with the seal retainers 10.4 and 44.2 with piston element 20, under the precondition that the connection of the two sheet metal elements 2.4 and 3.4 with piston element 20 is pressure-tight. Furthermore, if the connection is not pressure-tight the possible leakage flow, which cannot be held back by means of the sealing surfaces 6, 5.1, 5.2 and 44.2, is guided between the piston-side sheet metal element 3.4 of seal retainers 10.4 and 10.41 and the end face 20.2 of piston element 20. In addition, a leakage path between sheet metal element 3 and piston element 20 can be prevented by means of full or half beads formed on the sheet metal parts, as depicted by way of example in FIGS. 5a and 5b, or by means of an additionally inserted seal, such as a paper seal for example.

Figure 5A:
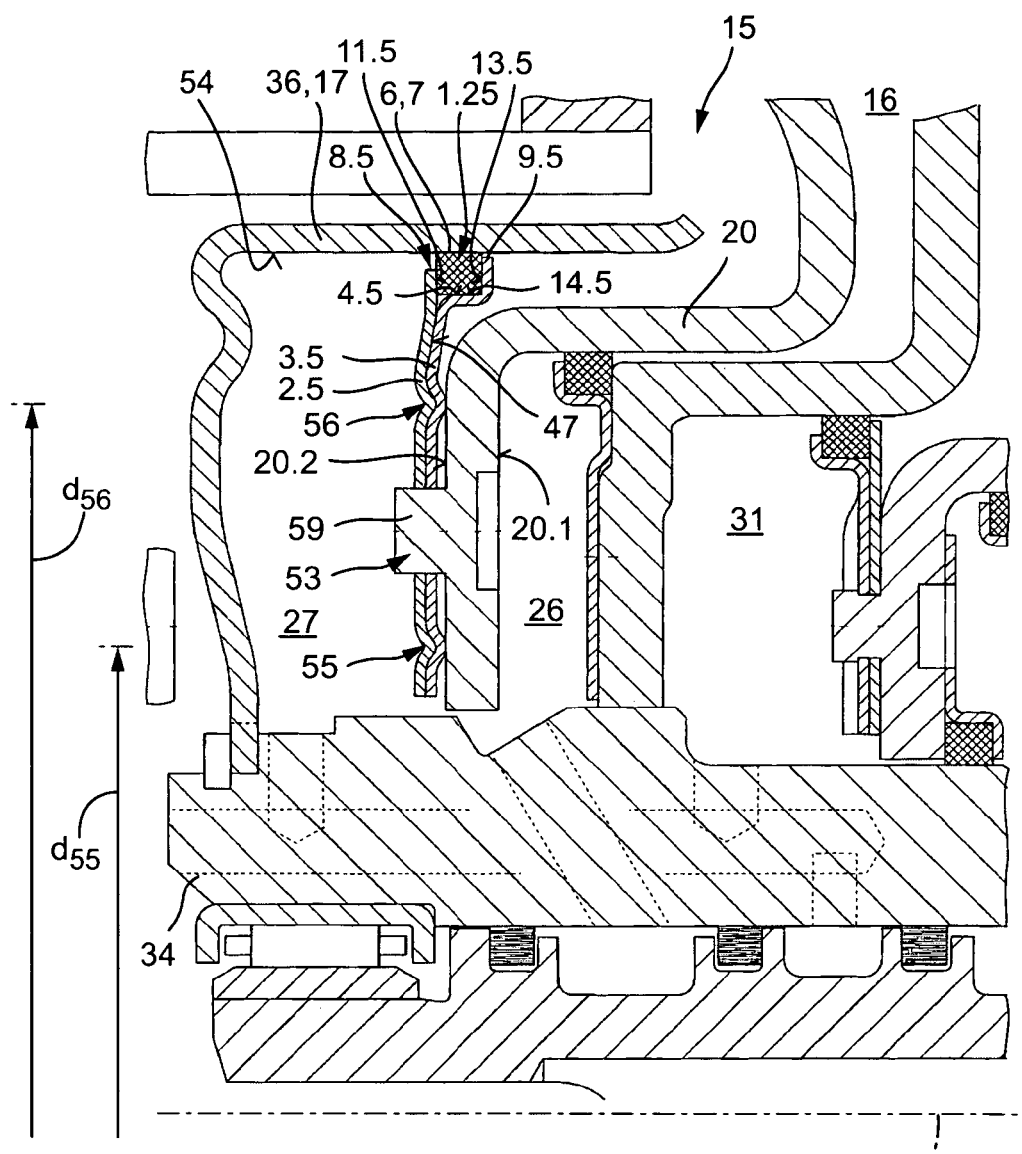
FIGS. 5a and 5b show a second alternately possible embodiment of the execution and arrangement according to the invention, of a sealing arrangement according to FIG. 4, in a double clutch arrangement.
Figure 5B:
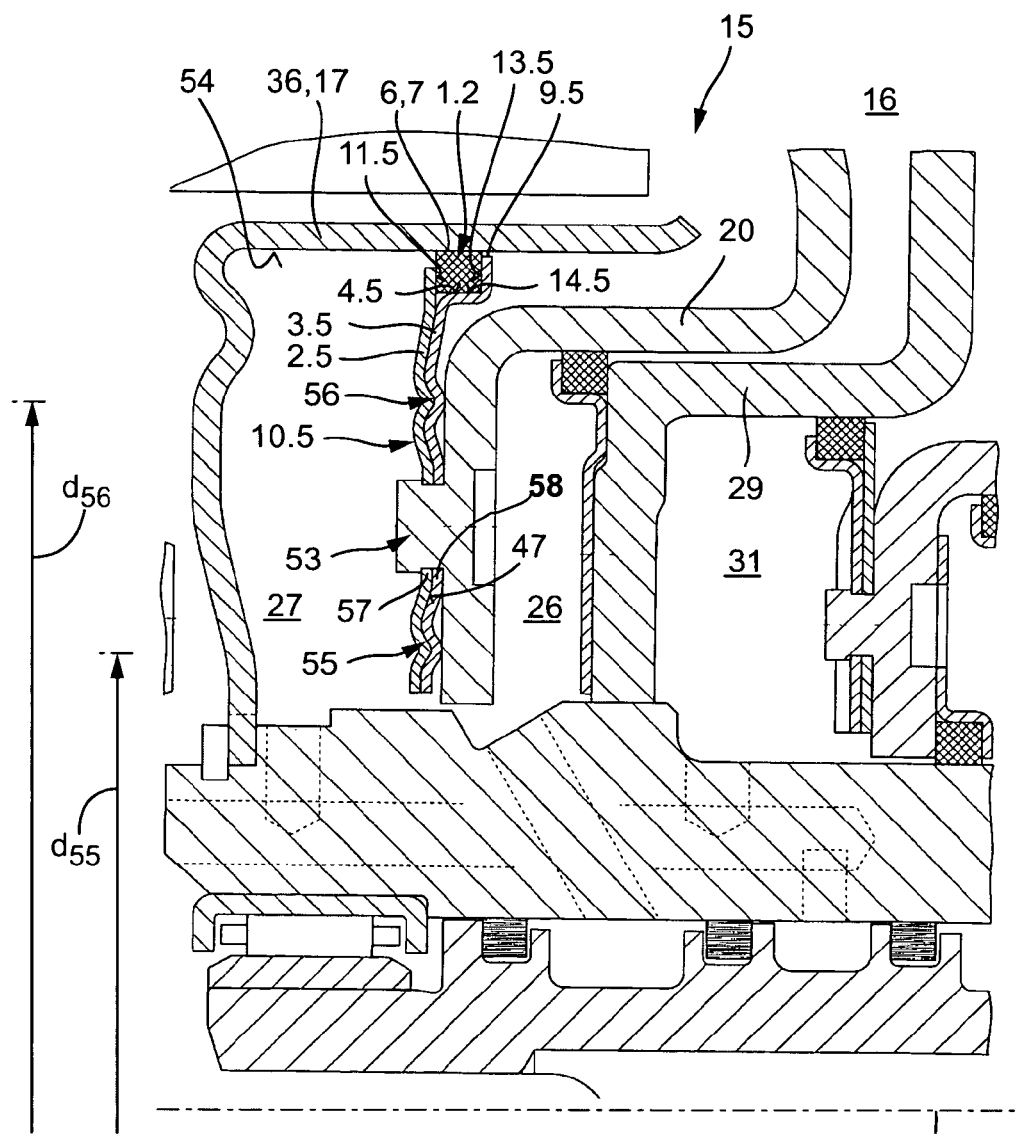

If FIG. 4 illustrates a first possible embodiment of the sealing arrangement 1.2 for sealing off the first outer compensating chamber, which corresponds to chamber 27 which is pressurizable with a pressurizing agent, FIGS. 5a and 5b illustrate another possible version of the sealing arrangement 1.25. In the version according to FIGS. 5a and 5b, only the compensating chamber is filled—i.e. the chamber 27 which is pressurizable with a pressurizing agent, between fixed component 36 and piston element 20. There is no provision here for sealing off this chamber 27 which is pressurizable with a pressurizing agent from chamber 26 which is pressurizable with a pressurizing agent, which functions as a pressure chamber. Therefore only an outer sealing device 5 in the radial direction is provided. Sealing device 5 is attached to piston element 20 by means of a seal retainer 10.5. Seal retainer 10.5 consists in this case of two disk-shaped sheet metal elements 2.5 and 3.5, which form a groove 4.5 to receive sealing device 5. Sealing device 5 preferably forms with its outer circumference a complete sealing surface 6, which forms a seal pairing with a surface 54 formed on fixed part 36 facing in the radial direction relative to sealing surface 6. Groove 4.5 is designed so that the second sheet metal element 3.5 on the piston side is formed in its outer end region 9.5 in the radial direction and forms a radial contact surface 14.5 and an axial contact surface 13.5 for sealing device 5, while first sheet metal element 2.5 forms a contact surface 11.5 in the axial direction for sealing device 5 in the radial outer end region 8.5, with its face 47 directed toward the second sheet metal element. In order to prevent an outward shift of a leakage flow from chamber 27, pressurizable with a pressurizing agent, in the direction of the interior space 16 of the clutch arrangement, seal retainer 10.5 is designed with one or more formed-on sealing lips 55 and 56, which are arranged one behind the other in the direction of the leakage flow, in particular one behind the other in the radial direction, and which extend in the circumferential direction around the entire circumference of seal retainer 10.5, with the extension covering a certain diameter d55 and d56 for the individual sealing lips 55 and 56. In FIG. 5a these sealing lips 55 and 56 are produced by full beads. But a half-bead design is also conceivable. Seal retainer 10.5 is connected to piston element 20 in a rotationally fixed connection. The rotationally fixed connection is made here in exemplary fashion with rivets 53 extruded from the piston element.

The pre-tensioning at the individual seal locations, in particular sealing lips 55 and 56, results here from the elastic deformation of the sheet metal elements 2.5 and 3.5 during riveting. While FIG. 5a shows the condition before riveting, FIG. 5b illustrates the condition after riveting. At the same time, it is evident that after the riveting according to FIG. 5b sheet metal elements 2.5 and 3.5 each have a recess 57 and 58 between the sealing lips 55 and 56, respectively. During the riveting procedure the sheet metal elements 2.5 and 3.5 are deformed elastically in the area of the rivet shaft 59 in such a way that they lie flat against piston element 20 with a portion of their face that is directed toward piston element 20. The riveted parts then no longer have any differential spacing from each other.

Figure 6A:
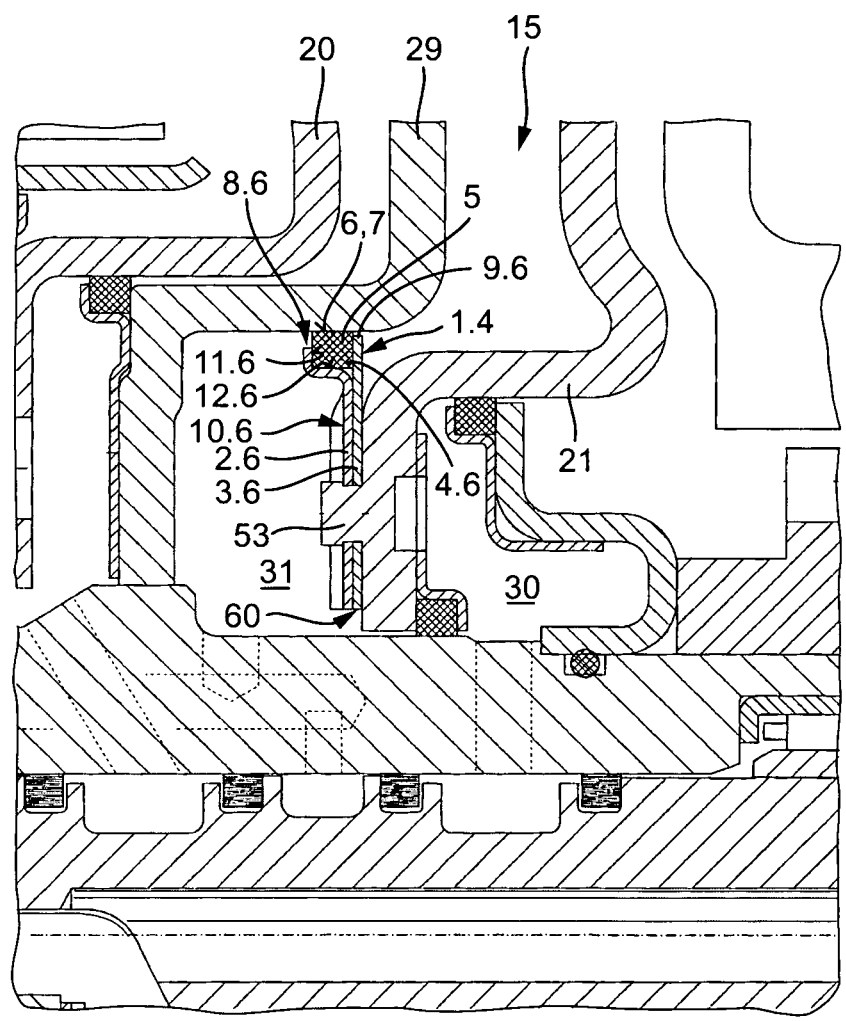
FIGS. 6a and 6b show a third possible embodiment of the execution and arrangement according to the invention, of a sealing arrangement for sealing off a compensating chamber of a double clutch arrangement.
Figure 6B:
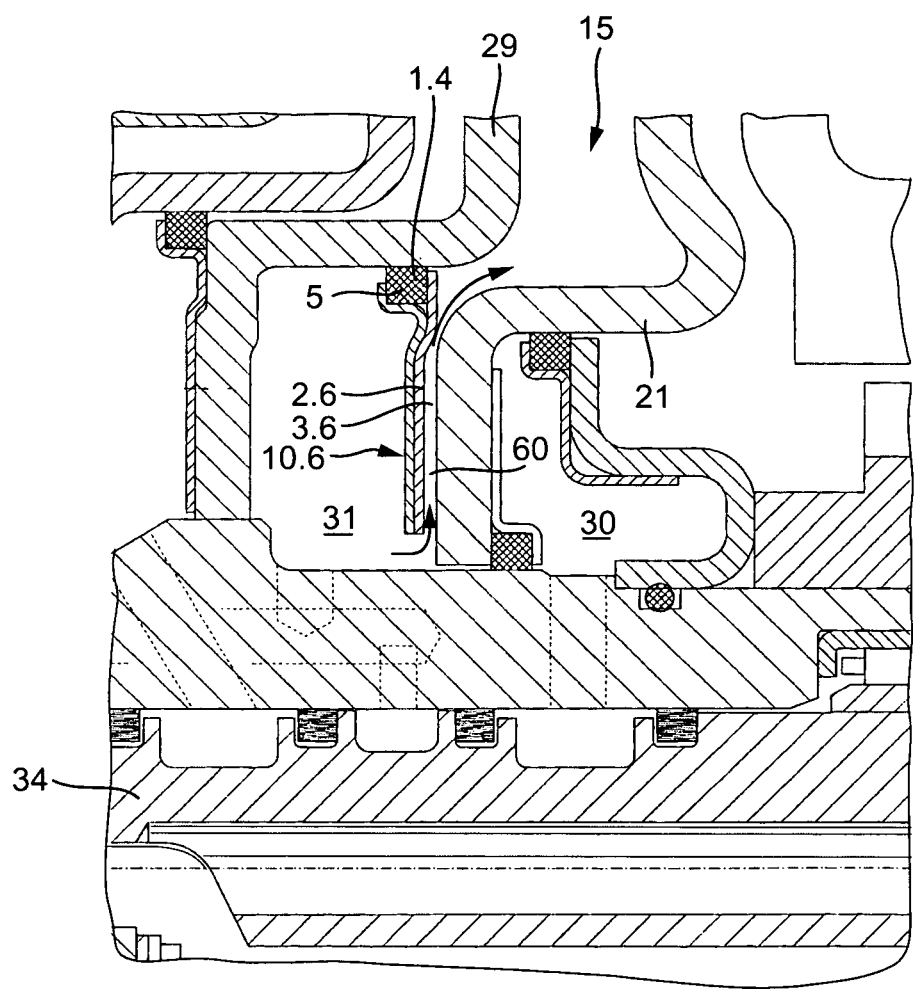

FIGS. 6a and 6b illustrate versions of the sealing arrangement 1.4 for sealing the compensating chamber assigned to the second piston element 21 in the form of the second chamber 31 pressurizable with a pressurizing agent. This sealing arrangement 1.4 also includes a seal retainer 10.6 according to the invention. The latter comprises two separate sheet metal elements 2.6 and 3.6, with these holding a sealing device 5 in the groove 4.6. The groove 4.6 here again is also formed by the end regions 8.6 and 9.6 of the two sheet metal elements 2.6 and 3.6, with the sheet metal element 3.6 on the piston side in the depicted case designed as a flat sheet metal element 3.6, while the first sheet metal element 2.6 in the end region 9.6 is bent in an S-shaped cross section and forms contact surfaces 12.6 in the radial and 11.6 in the axial direction for the sealing device 5. The outer circumference 7 of sealing device 5 forms a sealing surface 6, which forms the seal pairing with a sub-region on housing part 29 that describes an inner circumference. Seal retainer 10.6 is connected to piston element 21 in a rotationally fixed connection, preferably here also by means of rivets extruded from piston element 21. The riveting is performed with spacing relative to each other in the circumferential direction, preferably with uniform spacing. Other possibilities are conceivable. In the non-rivet area between piston element 21 and seal retainer 10.6, a connection is created here to the rest of clutch interior 16. This provides for ventilation when filling the compensating chamber for clutch device K2, for example, the outer clutch, and as overflow 60. The overflow 60 has essentially two functions, limiting the compensating pressure of the rotating oil ring due to the defined inside diameter of the oil ring, and overflow for the volume of oil displaced by the piston stroke. FIG. 6a illustrates the execution in the course of the section through the riveting, while in FIG. 6b the design of sealing arrangement 1.4 illustrates the course of the section outside of the riveting 53, from which the overflow 60 is recognizable between the individual chambers, in particular the compensating chamber 31 and the interior 16 of clutch arrangement 15.

Figure 7:
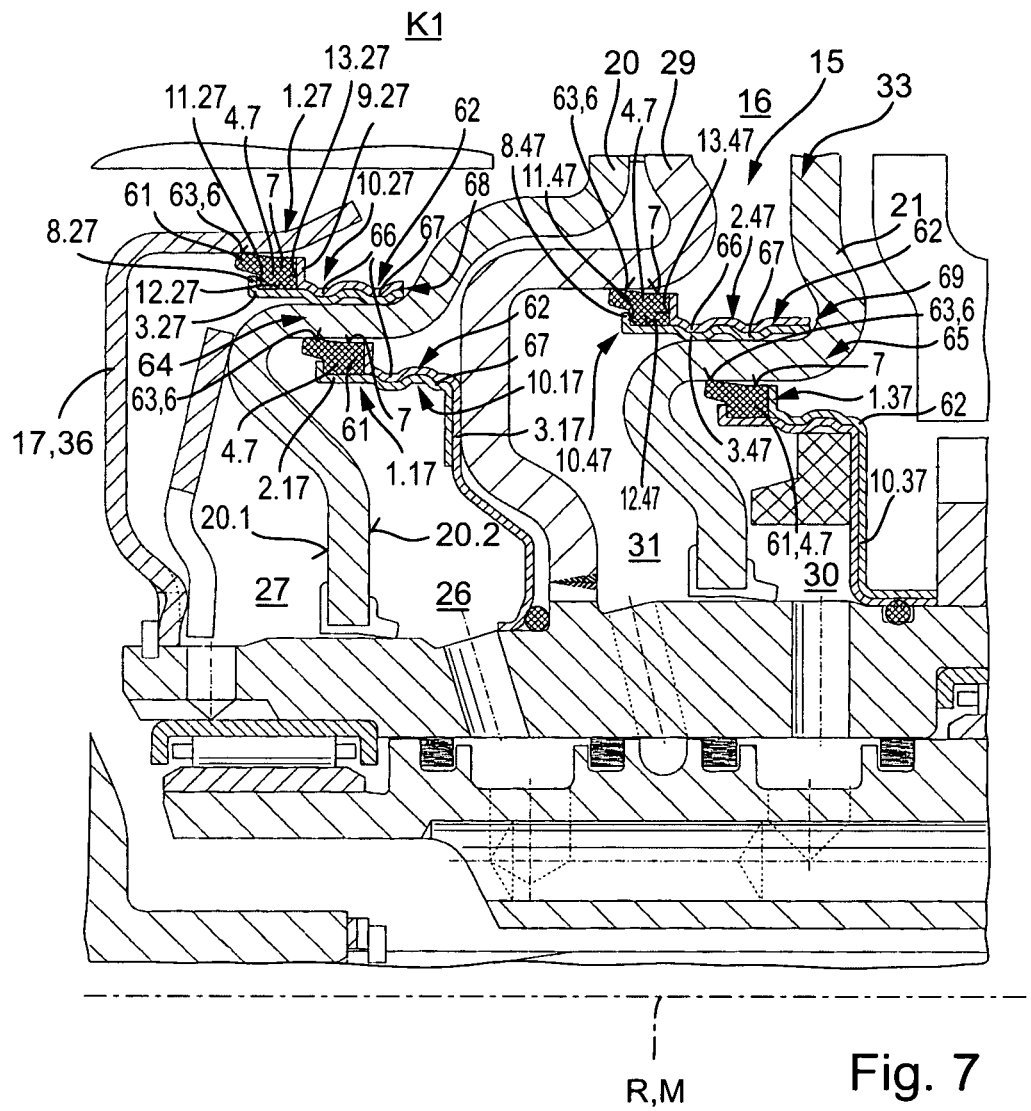
FIG. 7 shows the use of the sealing concept according to the invention in a double clutch arrangement, with clinched seal retainers.

While FIGS. 1 through 6 illustrate essentially seal retainers 10 with disk shaped design, and FIG. 7 illustrates a detail from an actuating unit of a double clutch arrangement 15 according to FIG. 3, in which the seal retainers 10 consist of two sheet metal elements 2 and 3, which are connected to each other in various ways in rotationally fixed connections and which extend in the radial direction, essentially in adaptation to the shape of the connecting elements, FIG. 7 shows a design for the sealing arrangements 1.17, 1.27, 1.37, 1.47 with seal retainers 10.17, 10.27, 10.37, 10.47 consisting of two sheet metal elements which are joined by means of a clinch connection, and furthermore a design of the seal retainer 10.27, 10.47 as a ring-shaped element. The sealing arrangements 1.17, 1.27, 1.37, 1.47 each have a seal retainer 10.17, 10.27, 10.37, 10.47, which preferably consists of two sheet metal elements 2.17, 2.27, 2.37, 2.47 and 3.17, 3.27, 3.37, 3.47. Here the two sheet metal elements are joined together positively in each case by means of a clinch connection 62. The individual seal retainers 10.17, 10.27, 10.37, 10.47 hold seals 61 here, seal retainers 10.17, 10.27, 10.37, 10.47 being designed in such a way that in their end regions they form the grooves 4.7 to receive the sealing device 61.

Seal retainers 10.27 and 10.47 are of ring-shaped design here; that is, they have no axial contact surfaces, but radial contact surfaces on the connecting elements. In this case, each of the sheet metal elements 3.27, 3.47 on the piston side, which form the inner sheet metal elements in the radial direction, form in their axial end regions 8.27 and 8.47 an axial stop face 11.27 or 11.47 and a radial stop face 12.47 and 12.27 for the sealing devices 61. By analogy, the other sheet metal element 2.27, 2.47 forms the contact surface 13.27, 13.47 located opposite the axial contact surface 11.27 or 11.47 in the axial direction for the sealing device 61. The sealing device 61 is designed here so that with a sub-region 63 of its outside circumference 7 it forms the sealing surface 6, which interacts with the stationary component 17, 36 or 29. Because of the incomplete contact of the surface formed by the outside circumference on the element forming the other sealing surface of the sealing pair, sealing device 61 can be designed in one end region in such a way that it lies in the same plane with the outside edge of the axial stop surface of the respective sheet metal element, in this case sheet metal element 2.27, 2.47. It would even be conceivable here, with the appropriate offset, to also provide a version of the sealing device in this area that lies inside groove 4.7.

If the sealing effect should be inadequate at the sealing edges produced, in particular the radial and axial contact surfaces on the seal retainer that interact with the sealing device 61 and the elements that form the other sealing surface of the sealing pairing, the clinch connection 62 takes over the function of sealing between the two sheet metal elements 2.27 and 3.27 or 2.47 and 3.47. The radial fixing of the two sheet metal elements 2.27 and 3.27 or 2.47 and 3.47 is accomplished by means of pressing them with overdimension onto a cylindrical region 64 and 65 on the piston elements 20 and 21 or a region of the piston elements 20 or 21 facing in the radial direction and forming an outside circumference. Preferably, full beads 66 and 67 are also provided on the seal retainers 10.27, 10.47. This contact on the full beads 66 and 67 results in a sealing effect between the inner sheet metal element in the radial direction, here the sheet metal element 3.27 or 3.47 on the piston side, and the respective piston element 20 or 21. The press fitting of the two connected sheet metal elements 2.27 and 3.27 or 2.47 and 3.47 is limited by the edge 68 or 69 on the piston element 20, 21, which is characterized for example by the design, tilted toward the cylindrical region, of the adjacent region of the piston elements 20, 21.

FIGS. 4 through 6 illustrate versions of the seal retainer made of two sheet metal elements, whereby the dimensioning and design of the latter make one of the dimensions of the sealing device freely selectable and at least not directly tied to a surface area on a wall delimiting the chambers pressurizable with a pressurizing agent, which surface area is necessary to form a seal pairing. For the sealing device, the compensation for example of a greater distance between the elements that are to be sealed off from each other—piston element and a stationary wall of the chamber pressurizable with a pressurizing agent—is accomplished by means of the seal retainer. This also applies by analogy to the positioning of the sealing device. The latter can be varied by means of the design of the seal retainer.

Figure 8:
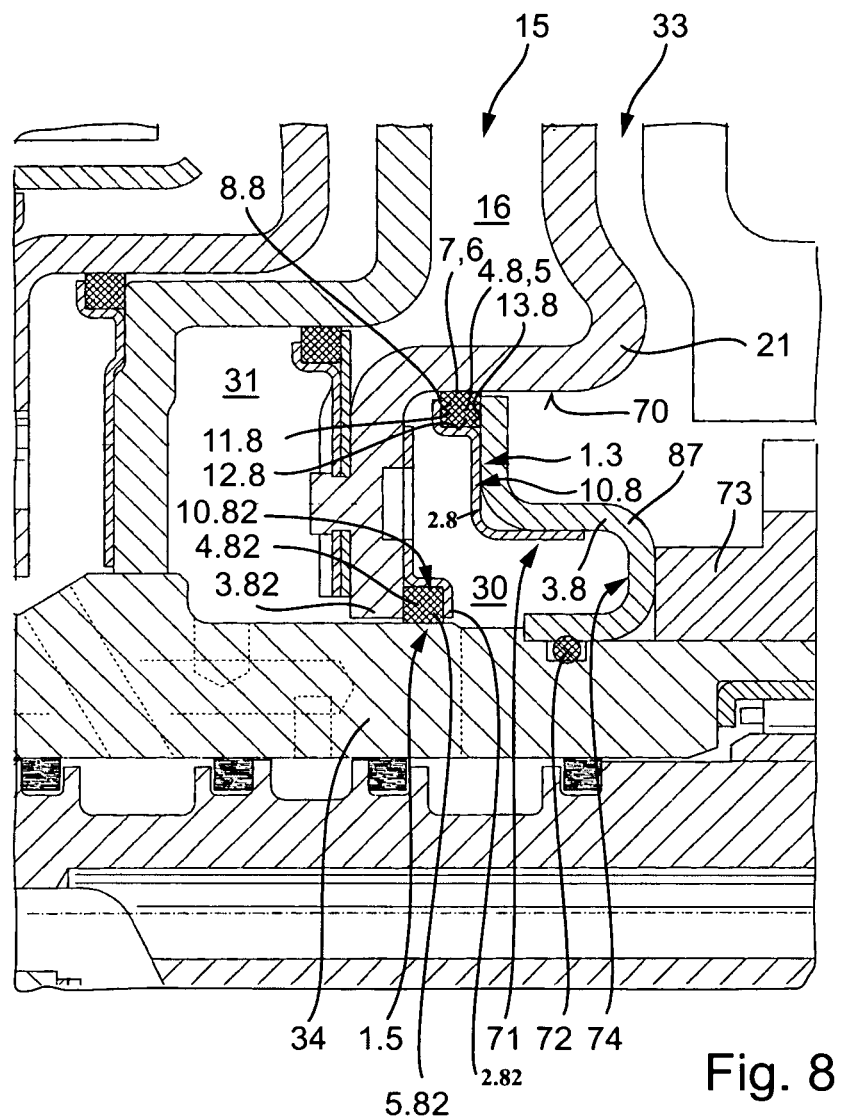
FIG. 8 show the execution of a sealing arrangement for a pressure chamber on the basis of a detail of an axial section of a double clutch arrangement according to the invention.
Figure 9A:
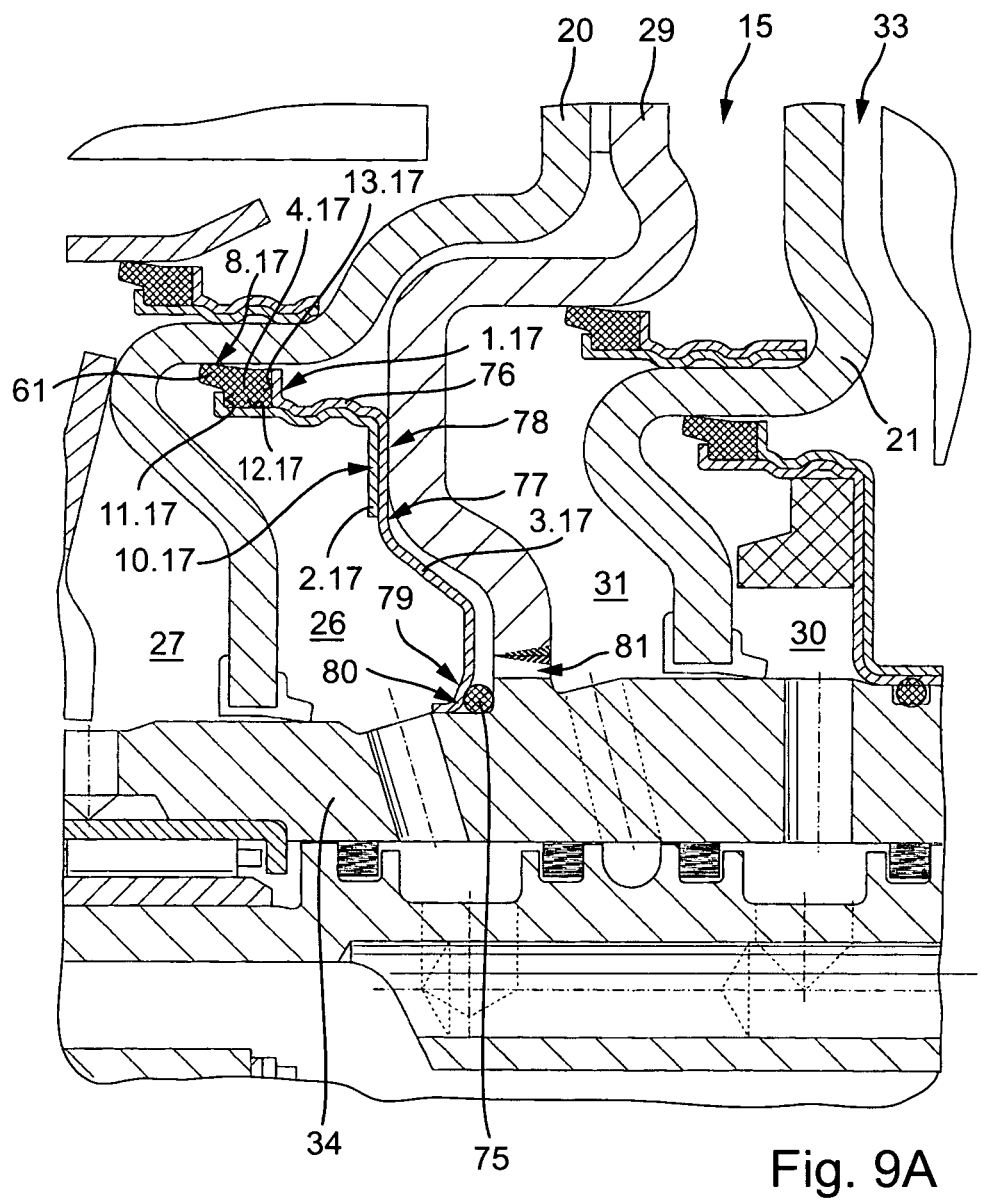
FIGS. 9a and 9b show a possible embodiment of the execution and arrangement according to the invention, of a sealing arrangement for sealing off a pressure chamber of a double clutch arrangement.
Figure 9B:
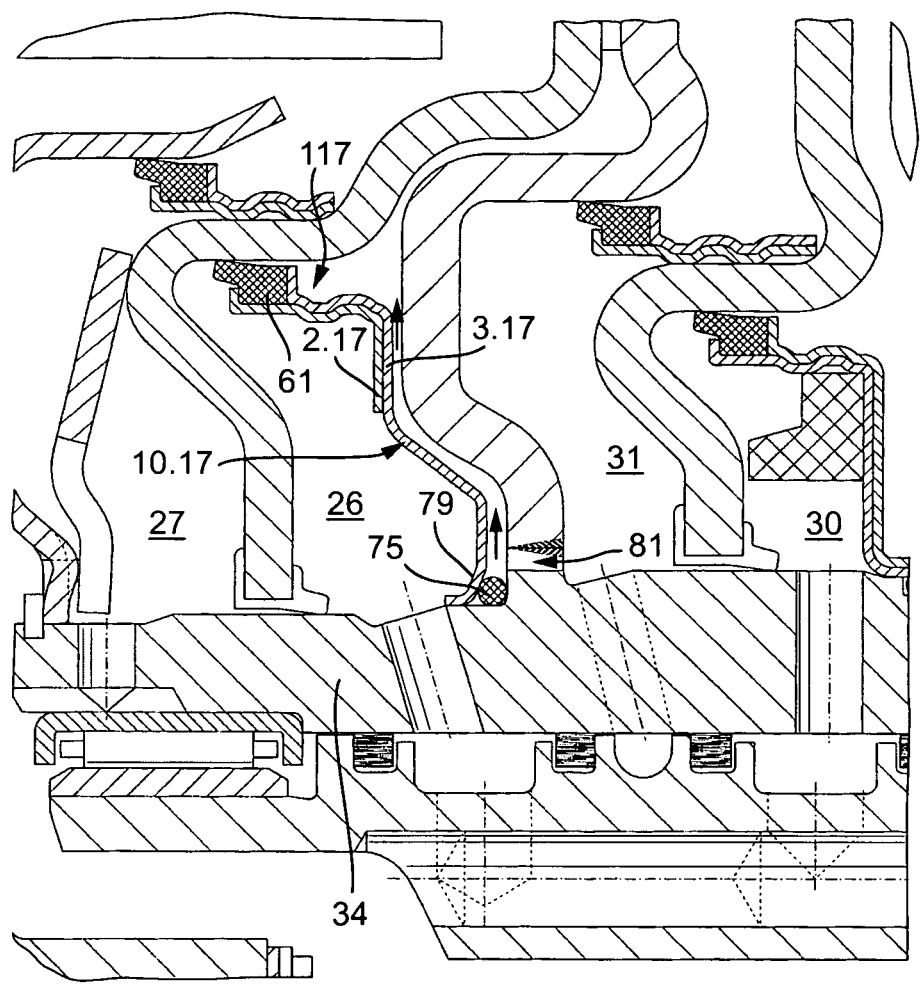
Figure 10:
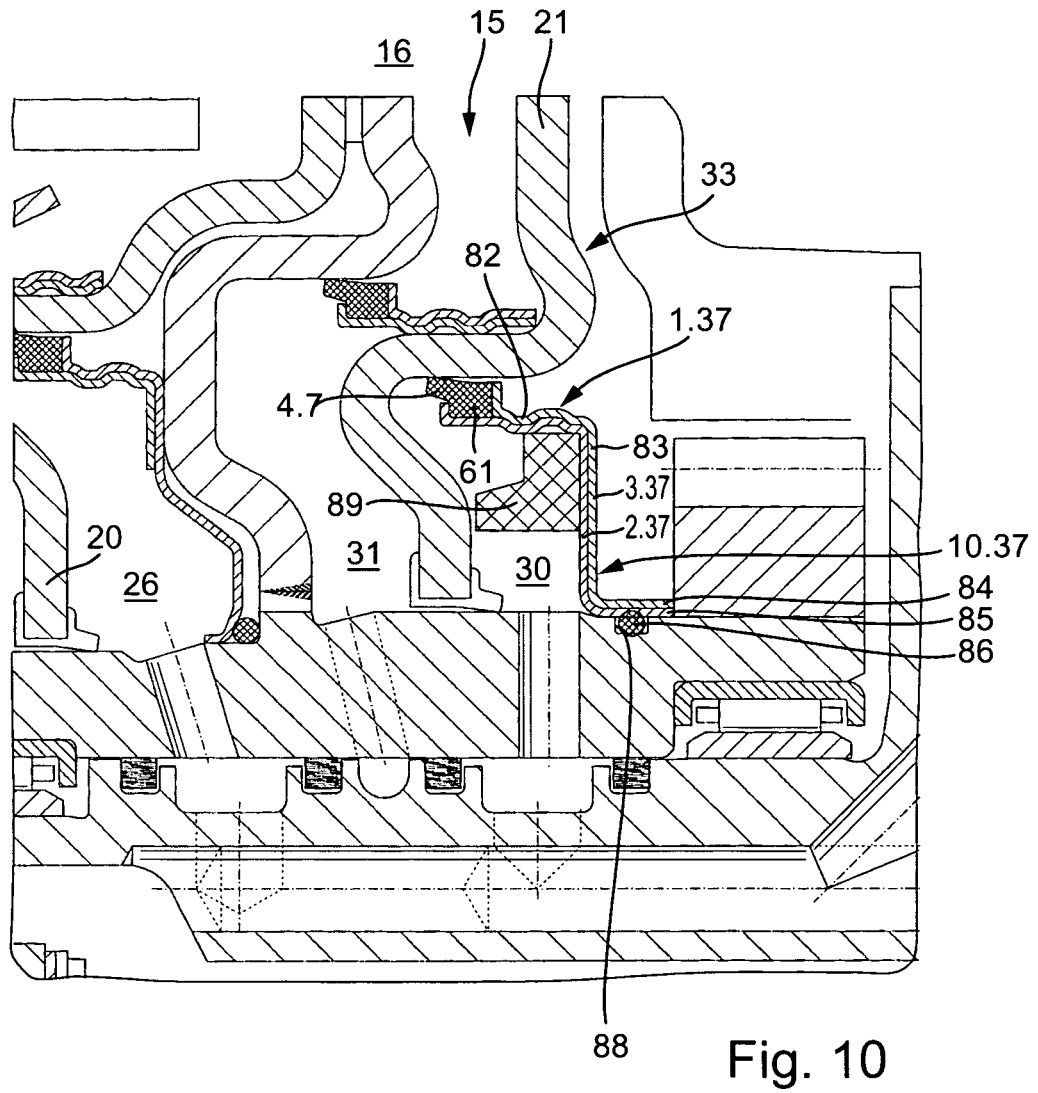
FIG. 10 shows another possible embodiment of the execution and arrangement according to the invention, of a sealing arrangement for sealing off a pressure chamber of a double clutch arrangement.

While FIGS. 4 through 7 illustrate designs for sealing off the compensating chambers of a dual-clutch design 15, FIGS. 8 through 10 show possibilities for the design of sealing arrangements for sealing off the pressure chambers 26, 30.

At the same time, FIG. 8 illustrates a version of the sealing arrangement 1.3 according to FIG. 3, for sealing off the chamber 30 pressurizable with a pressurizing agent, in the form of the pressure chamber. In this version, a seal retainer 10.8 is chosen which also comprises two sheet metal elements 2.8 and 3.8, which form a groove 4.8 in their radial outer end region, into which a sealing device 5 is inserted. Sealing device 5 is preferably also in turn designed as a sealing ring, and in the area of its outer circumference 7 it forms a sealing surface 6 over at least a part of that outer circumference, which forms a seal pairing with a surface 70 that forms an inner circumference in the radial direction. The two sheet metal elements 2.8 and 3.8 are designed with different thicknesses here, with sheet metal 3.8 simultaneously assuming the function of a wall, and thus a bearing function. Second sheet metal element 3.8 is designed as a thick, sturdy carrier plate that supports the compression forces. The areas that form the groove are therefore shaped on the thin sheet metal element 2.8, in that the end region 8.8 of the first sheet metal element 2.8 has an appropriately cranked shape and forms a contact surface 12.8 for the sealing device in the radial direction and 11.8 in the axial direction. The groove 4.8 is additionally formed by the axial contact surface 13.8 on the sheet metal element 3.8. As already explained, the shaping of the groove 4.8 is preferably accomplished on the thinner sheet metal element 2.8. The thicker carrier plate is preferably not reshaped for the sealing device 5. The thicker carrier plate forms a housing part or a wall of a component 87 delimiting the chamber 30. The connection between the thinner and the thicker sheet metal parts 2.8 and 3.8 is preferably a material connection; for example, the thinner sheet 2.8 is affixed to the second sheet 3.8 by means of a spot welded connection. For radial orientation, a centering 71 is provided, which may take various forms. In the simplest case, to that end a surface area is provided on carrier plate 3.8 that accordingly forms an inner circumference in the radial direction, which surface area enters into an operative connection with a surface area oriented outward in the radial direction on sheet metal element 2.8, and thereby limits the position in the radial direction for the second sheet metal element 2.8. To seal the carrier plate internally, another sealing device 72 can be provided between it and piston hub 34. This sealing device is preferably in the form of an O-ring, which is situated between piston hub 34 for piston element 21 and a cylindrical region located internally in the radial direction, for example, a region of sheet metal element 3.8 that forms an inner circumference. Sheet metal element 3.8 preferably has a C-shaped cross section, with a shoulder formed in the radial direction. The open end of the thick sheet metal element 3.8 serves as an axial stop 74, and thus can be fixed with a gear wheel 73.

In addition, to seal piston element 21 with respect to piston hub 34 a sealing arrangement 1.5 is provided. The latter includes a seal retainer 10.82, which includes a sheet metal element 2.8.2, which, together with sheet metal element 3.82 in the form of piston element 21 forms groove 4.82 to receive another sealing device 5.82. It is designed analogous to seal retainer 10.8.

FIGS. 9a and 9b illustrate a version of a sealing arrangement 1.17 for sealing off pressure chamber 26, in a section directly through the support for seal retainer 10.17 and through the ducting in a detail from FIG. 7. Sealing arrangement 1.17 here includes seal retainer 10.17 and two seals, a first sealing device 61 and a second sealing device 75, where first sealing device 61 seals off chamber 26 which is pressurizable with a pressurizing agent, in the radially outer region, and second sealing device 75 serves to seal off the radially inner region. Here too, seal retainer 10.17 comprises two sheet metal elements, the sheet metal elements 2.17 and 3.17, which are connected with each other positively in exemplary fashion by means of a clinch connection. Alternatively, a connection with a different inseparable connection would also be conceivable, for example a materially joined connection, for example spot welding. Seal retainer 10.17 has a cylindrical region 76 and a disk-shaped region, i.e. a region that is oriented in the vertical direction when seen in the installed position, where the region 77 oriented in the vertical direction has at least part of its face that is turned toward piston element 21 in contact with the latter. The materially joined connection is provided in this sub-region, which is designated as 78. The cylindrical or ring-shaped region 76 supports the sealing device 61. The groove 4.17 is formed in the latter. Here too, both sheet metal elements 2.17 and 3.17 are involved in forming the groove 4.17, with sheet metal element 3.17 on the piston side forming an axial contact surface 13.17, viewed in the installed position for the sealing device 61, while the other second sheet metal element 2.17 forms a contact surface 11.17 oriented opposite the first axial contact surface 13.17 in the axial direction, and also a contact surface 12.17 in the radial direction. To that end, first sheet metal element 2.17 has a region facing in the radial direction. The second sheet metal element, in particular sheet metal element 3.17 on the piston side, is situated in the cylindrical region 76 in the radial direction in such a way that it is situated above first sheet metal element 2.17. Sheet metal element 2.17 is in contact with sheet metal element 3.17 on the piston side, on the inner circumference as it were of the cylindrical region 76. Viewed in cross section, the sheet metal element describes at least one quasi-L-shape in this region; preferably it is matched as closely as possible to the geometry of piston element 21. Sheet metal element 2.17 extends only in the cylindrical region 76, and over just a sub-region of the face of sheet metal element 3.17. To limit the deformation of the clinched seal retainer 10.17 due to the high pressure (maximum 20 bar) prevailing in the chamber 26 pressurizable with a pressurizing agent, the seal retainer is braced against the stationary component 29, which is formed by the outer plate carrier of the outer clutch K2 in the radial direction. The region of the bracing, designated here as 78, should be at the smallest possible distance from the sealing edge, i.e. the sealing devices 61, in order to form the smallest possible effective lever arm.

If the leakage path, which is sketched in with an arrow in FIG. 9b, is obstructed by the seal by means of the sealing device 61 and the corresponding contact surface on sheet metal element 3.17, no additional sealing is necessary between sheet metal elements 2.17 and 3.17. If this is not the case, the clinch connection must be pressure-tight. The second sealing device 75 is situated between piston hub 34 or the hollow shaft and the sheet metal element 3.17 on the piston side. The latter is responsible for the inner sealing of pressure chamber 26. Advantageously, sheet metal part 3.17 is formed with a slope 79 in this region, so that a larger sealing region is produced between sealing device 75 and sheet metal element 3.17. The radial fixing of seal retainer 10.17 is performed by the cylindrical region formed on the inner circumference, i.e. a region 80 extending in the axial direction, which forms a surface area that describes an inner circumference, which acts together with piston hub 34 or the hollow shaft or is attached thereto, preferably for example by means of a compression connection. The axial bracing of seal retainer 10.17 on the outer plate carrier is partially interrupted, to form a connection from compensating chamber 27 through overflow bore 81 to the rest of the clutch chamber. This provides for ventilation when filling the chamber 27, which functions as a compensating chamber for the outer clutch, and as an overflow analogous to the illustration in FIG. 4.

The overflow function is depicted in detail in FIG. 9b. FIG. 9b contains a cross section in accordance with that in FIG. 9a, but not through the bracing but through the regions free of bracing. It is evident from this that an overflow 81 is ensured here.

FIG. 10 illustrates an embodiment for sealing off the outer pressure chamber, in particular the chamber 30 pressurizable with a pressurizing agent according to FIG. 7. Here too, seal retainer 10.37 is fabricated as a two-piece seal retainer made of two sheet metal elements, sheet metal elements 3.37 and 2.37. These are preferably connected to each other positively by means of a clinch connection. Other possibilities are also conceivable. Because of the prevailing pressures in the chamber 30 which is pressurizable with a pressurizing agent, and the pressure forces caused thereby, the total stiffness of the sheet metal elements 2.37 and 3.37 and also their merger into one module is reduced, most especially in the seal retainer 10.37. Sealing arrangement 1.37 here includes a sealing device 61, which is situated in the groove between the two sheet metal elements 2.37 and 3.37, where the two sheet metal elements preferably extend jointly over their entire extent from the outer to the inner circumference, forming two cylindrical zones 82 and 84 situated at an offset from each other in the radial direction, which are connected by means of a connecting region 83, and form an integrated arrangement, and thus are combined into one reinforced sheet metal unit. In this case the groove 4.7 is formed between first sheet metal element 2.37 and second sheet metal element 3.37. The embodiments in FIG. 9a can be referenced for the design of the groove 4.7.

The sheet metal unit in the form of seal retainer 10.37 is essentially Z-shaped, viewed in cross section, with the radially outer cylindrical region 82 forming the groove 4.7, while the radially inner region 84 also functions as sealing surface 85. Sealing device 86 serves in this case to seal off pressure chamber 30. The latter is situated between seal retainer 37, which at the same time delimits pressure chamber 30, and piston element 21. The radially inner sealing device 86 is situated between a region of seal retainer 10.37 that forms an inner circumference, and piston hub 34. Sealing device 86 is preferably in the form of an O-ring. This is integrated into a groove 88 in the piston hub.

If the leakage path between the individual sheet metal elements 2.37 and 3.37 is prevented at least one of the sealing edges that are formed at the contact surfaces of the sealing device, no other sealing measures are necessary between the sheet metal parts 2.37 and 3.37. If the sealing effect is not sufficient, the clinch connection between sheet metal elements 2.37 and 3.37 takes over the job of sealing between the two sheet metal parts. The air passage of the piston is limited by an integrated stop 89, which is advantageously made of plastic.

FIGS. 4 through 10 show by way of example advantageous embodiments of the sealing arrangement according to the invention, in particular of the seal retainer on the output side of a dual clutch, to seal off the individual chambers, assigned to the actuating system, in particular pressure chambers and compensating chambers. The depicted embodiments are intended as examples, and at the same time represent advantageous designs. Other versions and deviations, in particular in designing the geometry of the seal retainer as viewed in cross section, comprise a great many possibilities, not all of which can be gone into in detail here, but which fall within the discretionary power of the responsible person skilled in the art, in particular as dictated by the space conditions and the requisite functions.

REFERENCE LABELS
1, 1.1b, 1.1, 1.2, 1.3, 1.4, 1.5,
1.25, 1.17, 1.27, 1.37, 1.47 sealing arrangement
2, 2.4, 2.5, 2.6, 2.17, 2.27,
2.37, 2.47, 2.8, 2.82 first sheet metal element
3, 3.1b, 3.4, 3.5, 3.6, 3.17,
3.27, 3.37, 3.47, 3.8, 3.82 second sheet metal element
4, 4.1b, 4.4, 4.5, 4.6, 4.7,
4.27, 4.37, 4.47, 4.8, 4.82 groove
5, 5.82 seal
5.1, 5.2 sealing surface
6 sealing surface
7 outer circumference
8, 8.4, 8.5, 8.6, 8.17, 8.27,
8.37, 8.47, 8.8 end region
9, 9.1b, 9.4, 9.5, 9.6, 9.17,
9.27, 9.37, 9.47, 9.8 end region
10, 10.4, 10.41, 10.5, 10.6,
10.17, 10.27, 10.37, 10.47,
10.8, 10.82 seal retainer
11, 11.4, 11.5, 11.6, 11.17,
11.27, 11.37, 11.47, 11.8 contact surface
12, 12.4, 12.5, 12.6, 12.17,
12.27, 12.37, 12.47, 12.8 contact surface
13, 13.4, 13.5, 13.6, 13.17,
13.27, 13.37, 13.47, 13.8 contact surface
14, 14.4, 14.5, 14.6, 14.17,
14.27, 14.37, 14.47, 14.8 contact surface
15 wet-running double clutch arrangement
16 interior space
17 housing part
18 actuating device
19 actuating device
20 piston element
20.1, 20.2 face
21 piston element
21.1, 21.2 face
22 first clutch part
23 second clutch part
24 first clutch part
25 second clutch part
26 chamber pressurizable with a pressurizing agent
27 chamber pressurizable with a pressurizing agent
28.1, 28.2, 28.3, 28.4 sealing device
29 housing part
30 chamber pressurizable with a pressurizing agent
31 chamber pressurizable with a pressurizing agent
32 inner circumference of seal
33 actuating unit
34 piston hub
35 clutch housing
36 component
37 component
38 component
39 housing wall
40 connection
41 connection
42 connection
43 connection
44 sealing device
44.1, 44.2 face, sealing surface
45 sealing device
46 outer circumference
47 face
48 face
49 groove
50 inner circumference
51 radially inner end region
52 sealing surface
53 rivet
54 surface
55 sealing lip
56 sealing lip
57 recess
58 recess
59 rivet shaft
60 overflow
61 sealing device
62 clinch connection
63 sub-region
64 sub-region
65 cylindrical region
66 bead
67 bead
68 edge
69 edge
70 surface
71 centering
72 sealing device
73 gear wheel
74 stop
75 sealing device
76 region
77 region
78 sub-region
79 slope
80 region
81 overflow
82 cylindrical region
83 region
84 cylindrical region
85 sealing surface
86 sealing device
87 element 88 groove
89 stop
D thickness
t groove depth
$d_{55}$ diameter
$d_{56}$ diameter
K1 first clutch device
K2 second clutch device
E input
A output
R axis of rotation
M center axis

What is claimed is:

1. A sealing arrangement for an actuating device actuatable by a pressurizing agent in a clutch arrangement, for sealing off a chamber assigned to the latter pressurizable with a pressurizing agent, comprising:
at least one elastic sealing device, the sealing device being guided on at least one sheet metal element, the sheet metal element being attached to a chamber delimiting element pressurizable with a pressurizing agent such that the sealing device is sandwiched between the sheet metal element and the chamber delimiting element or between the sheet metal element and a further sheet metal element, the sealing device directly contacting an additional element, one of the additional element and the chamber delimiting element being axially slidable with respect to the other of the additional element and the chamber delimiting element such that the sealing device contacts and axially slides along a surface of the chamber delimiting element as the one of the additional element and the chamber delimiting element axially slides with respect to the other of the additional element and the chamber delimiting element.

2. The sealing arrangement as recited in claim 1 wherein the chamber delimiting element is formed by the actuating device or a housing wall.

3. The sealing arrangement as recited in claim 1 further comprising a seal retainer, the seal retainer being defined by the sheet metal element and the further sheet metal element forming a groove for receiving the sealing device.

4. The sealing arrangement as recited in claim 3 wherein the actuating device or another chamber delimiting element forms one of the sheet metal element and further sheet metal element.

5. The sealing arrangement as recited in claim 4 wherein the sheet metal element and further sheet metal element connected to the chamber delimiting element have at least two contact surfaces forming the groove, and the chamber delimiting element forms only one radial or axial contact surface of the groove for the sealing device.

6. The sealing arrangement as recited in claim 3 wherein the sheet metal element and further sheet metal element are two separate sheet metal elements attached to the chamber delimiting element to form the seal retainer.

7. The sealing arrangement as recited in claim 6 wherein one of measurements or dimensionings of the sealing device guided in the seal retainer is selectable independent of geometry and/or dimensionings of the chamber delimiting element, the chamber delimiting element also being attached to the seal retainer.

8. The sealing arrangement as recited in claim 7 wherein the measurement or dimensionings of the sealing device is the circumference of the sealing device.

9. The sealing arrangement as recited in claim 6 wherein the one of the sheet metal element and the further sheet metal element forms at least two contact surfaces forming the groove, the other of the sheet metal element and further sheet metal element forming only one contact surface.

10. The sealing arrangement as recited in claim 6 wherein at least two contact surfaces have at least sub-regions that define the groove formed by the sheet metal element and the further sheet metal element of the sealing device.

11. The sealing arrangement as recited in claim 6 wherein the sheet metal element and further sheet metal element are connected to each other as a preassembled module.

12. The sealing arrangement as recited in claim 11 wherein the connection of the sheet metal element and further sheet metal element is inseparable.

13. The sealing arrangement as recited in claim 12 wherein the connection is a positive or material connection.

14. The sealing arrangement as recited in claim 12 wherein the connection of the sheet metal element and further sheet metal element is a clinch connection.

15. The sealing arrangement as recited in claim 12 wherein the connection of the sheet metal element and further sheet metal element is a welded connection.

16. The sealing arrangement as recited in claim 15 wherein the welded connection is a spot welded connection.

17. The sealing arrangement as recited in claim 6 wherein the two separate sheet metal elements of the seal retainer are fixed relative to each other forming the groove when attached to the chamber delimiting element.

18. The sealing arrangement as recited in claim 1 wherein the connection of the sheet metal element and the chamber delimiting element is rotationally fixed.

19. The sealing arrangement as recited in claim 18 wherein the connection of the sheet metal element and the chamber delimiting element is pressure-tight and liquid-tight.

20. The sealing arrangement as recited in claim 1 wherein the connection of the sheet metal element and the chamber delimiting element is separable.

21. The sealing arrangement as recited in claim 20 wherein the connection of the sheet metal element and the chamber delimiting element is frictional or positive.

22. The sealing arrangement as recited in claim 20 wherein the connection of the sheet metal element and the chamber delimiting element is a compression connection.

23. The sealing arrangement as recited in claim 1 wherein the connection of the sheet metal element and the chamber delimiting element is inseparable.

24. The sealing arrangement as recited in claim 23 wherein the connection of the sheet metal element and the chamber delimiting element is positive.

25. The sealing arrangement as recited in claim 24 wherein the connection of the sheet metal element and the chamber delimiting element is a riveted connection, the riveting being separate rivets or rivets extruded from a connecting element.

26. The sealing arrangement as recited in claim 24 wherein the connection of the sheet metal element and the chamber delimiting element is a welded connection.

27. The sealing arrangement as recited in claim 24 wherein the connection of the sheet metal element and the chamber delimiting element is a clinch connection.

28. The sealing arrangement as recited in claim 1 further comprising a sub-region forming a contact surface on the sheet metal element, wherein the sub region contacting the chamber delimiting element has a plurality of full or half beads.

29. The sealing arrangement as recited in claim 28 wherein the plurality of full or half beads being inserted one after another in the sub-region in a direction of leakage flow, foaming sealing lips between the sheet metal element and the chamber delimiting element.

30. The sealing arrangement as recited in claim 1 wherein the sheet metal element contacting the chamber delimiting element has a surface seal between the sheet metal element and the chamber delimiting element.

31. The sealing arrangement as recited in claim 1 wherein the sheet metal element contacting with the chamber delimiting element has an overflow channel in between the sheet metal element and the chamber delimiting element.

32. The sealing arrangement as recited in claim 1 wherein the sealing device is a radial seal.

33. The sealing arrangement as recited in claim 32 wherein the radial seal is a radial outer seal or a radial inner seal.

34. The sealing arrangement as recited in claim 1 wherein the sealing device is an axial seal.

35. The sealing arrangement as recited in claim 1 wherein the sealing device is an 0-ring, a rectangular ring or a seal having a freely formed shape of the surface region forming the sealing surface and/or cross section geometry.

36. A double clutch arrangement comprising:
   one input;
   two outputs, and between the input and each of the outputs a first clutch device and a second clutch device located coaxially with respect to each other, each clutch device having an actuating device including a piston element and at least one chamber assigned to the actuating device, the chamber being pressurizable with a pressurizing agent, the chamber pressurizable with a pressurizing agent being sealed off from the rest of the interior space of the double clutch arrangement; and
   at least one sealing arrangement sealing the at least one individual chamber pressurizable with a pressurizing agent, the at least one sealing arrangement as recited in claim 1.

37. The double clutch arrangement as recited in claim 36 wherein the double clutch arrangement is a wet running clutch arrangement.

38. The double clutch arrangement as recited in claim 36 wherein the chamber pressurizable with the pressurizing agent is assigned to the piston element of the first clutch device, and a the sealing arrangement being located between the piston element and a housing wall delimiting the chamber pressurizable with a pressurizing agent.

39. The double clutch arrangement as recited in claim 36 wherein the at least one chamber includes a first chamber, the first chamber functioning as a compensating chamber pressurizable with a pressurizing agent, the first chamber being assigned to the piston element of the first clutch device, and further comprising a sealing arrangement being located between the piston element and a housing wall that delimits the first chamber.

40. The double clutch arrangement as recited in claim 36 wherein the at least one chamber including a first chamber functioning as a pressure chamber pressurizable with a pressurizing agent, the first chamber being assigned to the piston element of the second clutch device, and further comprising a sealing arrangement between the piston element and a housing wall that delimits the first chamber.

41. The double clutch arrangement as recited in claim 36 wherein at least one chamber including a first chamber functioning as a compensating chamber pressurizable with a pressurizing agent, the first chamber being assigned to the piston element of the second clutch device, and further comprising a sealing arrangement being located between the piston element of the second clutch device and a housing wall that delimits the first chamber.

42. The double clutch arrangement as recited in claim 39 wherein the sealing arrangement for sealing the compensating chamber has an overflow through at least one connecting duct located between a seal retainer and a connecting element.

\* \* \* \* \*